US010733624B2

(12) United States Patent
Loeb et al.

(10) Patent No.: US 10,733,624 B2
(45) Date of Patent: Aug. 4, 2020

(54) SYSTEM, METHOD, AND DEVICE FOR MANAGING EVENTS

(71) Applicants: Michael R. Loeb, New York, NY (US); Dan McCabe, Wilton, CT (US); Steven Marcus, New Rochelle, NY (US); Andrew Bein, Riverside, CT (US)

(72) Inventors: Michael R. Loeb, New York, NY (US); Dan McCabe, Wilton, CT (US); Steven Marcus, New Rochelle, NY (US); Andrew Bein, Riverside, CT (US)

(73) Assignee: MOBISAVE LLC, New York, NY (US)

( * ) Notice: Subject to any disclaimer, the term of this patent is extended or adjusted under 35 U.S.C. 154(b) by 295 days.

(21) Appl. No.: 15/643,587

(22) Filed: Jul. 7, 2017

(65) Prior Publication Data

US 2018/0018691 A1    Jan. 18, 2018

Related U.S. Application Data

(60) Provisional application No. 62/361,752, filed on Jul. 13, 2016.

(51) Int. Cl.
*G06Q 30/02*    (2012.01)

(52) U.S. Cl.
CPC ..... *G06Q 30/0234* (2013.01); *G06Q 30/0204* (2013.01)

(58) Field of Classification Search
None
See application file for complete search history.

(56) References Cited

U.S. PATENT DOCUMENTS

| | | | | |
|---|---|---|---|---|
| 5,758,328 | A * | 5/1998 | Giovannoli | G06Q 30/06 705/26.4 |
| 6,778,968 | B1 * | 8/2004 | Gulati | G06Q 30/08 705/35 |
| 8,224,691 | B1 * | 7/2012 | Scroggie | G06Q 30/0207 705/14.1 |
| 2003/0139969 | A1 * | 7/2003 | Scroggie | G06Q 30/0241 705/14.36 |
| 2008/0059297 | A1 * | 3/2008 | Vallier | G06Q 30/02 705/14.27 |
| 2009/0248496 | A1 * | 10/2009 | Hueter | G06Q 10/00 705/7.29 |

(Continued)

*Primary Examiner* — Leland Marcus
(74) *Attorney, Agent, or Firm* — Buckley, Maschoff & Talwalker LLC

(57) ABSTRACT

Provided are systems, devices, and methods for routing events. In one example, an application server includes a network interface to receive demographic information and a request from a mobile application executing on a mobile device, and a processor configured to identify an item that corresponds to the request, identify a web server that corresponds to the item, generate an event based on the request, and determine whether the event corresponds to the application server or the web server based on a combination of the item and the received demographic information. The processor may further process the event or control the network interface to transmit the event to the web server, based on determining whether the event corresponds to the application server or the web server.

14 Claims, 5 Drawing Sheets

(56) References Cited

U.S. PATENT DOCUMENTS

| | | | |
|---|---|---|---|
| 2010/0262487 A1* | 10/2010 | Edwards | G06Q 30/02 705/14.43 |
| 2011/0066484 A1* | 3/2011 | Cha | G06O 30/02 705/14.23 |
| 2011/0153396 A1* | 6/2011 | Marcuvitz | G06Q 30/0245 705/14.2 |
| 2012/0264511 A1* | 10/2012 | Marsland | H04L 67/38 463/31 |
| 2014/0074569 A1* | 3/2014 | Francis | G06Q 20/40 705/14.3 |
| 2014/0316928 A1* | 10/2014 | Springer | G06Q 30/0611 705/26.4 |
| 2015/0206164 A1* | 7/2015 | Espana | G06Q 30/0222 705/14.23 |
| 2016/0203548 A1* | 7/2016 | Simmons | G06Q 30/08 705/26.3 |
| 2016/0246455 A1* | 8/2016 | Choi | G06F 3/011 |

\* cited by examiner

SYSTEM, METHOD, AND DEVICE FOR MANAGING EVENTS

CROSS-REFERENCE TO RELATED APPLICATION(S)

This application claims the benefit under 35 USC § 119(e) of U.S. Provisional Patent Application No. 62/361,752, filed on Jul. 13, 2016, the entire disclosure of which is hereby incorporated by reference and for all purposes.

BACKGROUND

A mobile application (i.e., mobile app) is a computer program designed to run on mobile devices such as smartphones and tablet computers. A mobile device is typically purchased with several mobile apps pre-installed such as a web browser, email client, calendar, mapping program, music player, and the like. Additional mobile applications are also available for download through distribution platforms referred to as app stores. An app store is typically operated by the owner of the mobile operating system, such as the Apple App Store, Google Play, Windows Phone Store, and BlackBerry App World. Some apps are free, while others must be bought. Usually, they are downloaded from the platform to a target mobile device, but sometimes they can be downloaded to laptops or desktop computers.

In an effort to provide users with mobile applications that are more tailored to their individual interests, organizations have recently begun tracking information about users. For example, organizations such as mobile device manufacturers, mobile app developers, social network sites, web developers, and the like, have begun gathering information about way they a user uses their mobile applications and mobile devices. Examples of information include how long a user spends performing various activities with their mobile device, what apps are downloaded to the mobile device, app usage information, app categorization, mobile app trends, and the like.

SUMMARY

According to an aspect of an example embodiment, provided is an application server including a network interface configured to receive demographic information and a request from a mobile application executing on a mobile device, and a processor configured to identify an item that corresponds to the request, identify a web server that corresponds to the item, generate an event based on the request, and determine whether the event corresponds to the application server or the web server based on a combination of the item and the received demographic information, wherein the processor is further configured to process the event or control the network interface to transmit the event to the web server, based on the determining whether the event corresponds to the application server or the web server.

According to an aspect of another example embodiments, provided is a method of an application server, the method including receiving demographic information and a request from a mobile application executing on a mobile device, identifying an item that corresponds to the request and identifying a web server that corresponds to the item, generating an event based on the request, determining whether the event corresponds to the application server or the web server based on a combination of the item and the received demographic information, and processing the event by the application server or transmitting the event to the web server, based on the determining whether the event corresponds to the application server or the web server.

Other features and aspects will become apparent from the following detailed description when taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
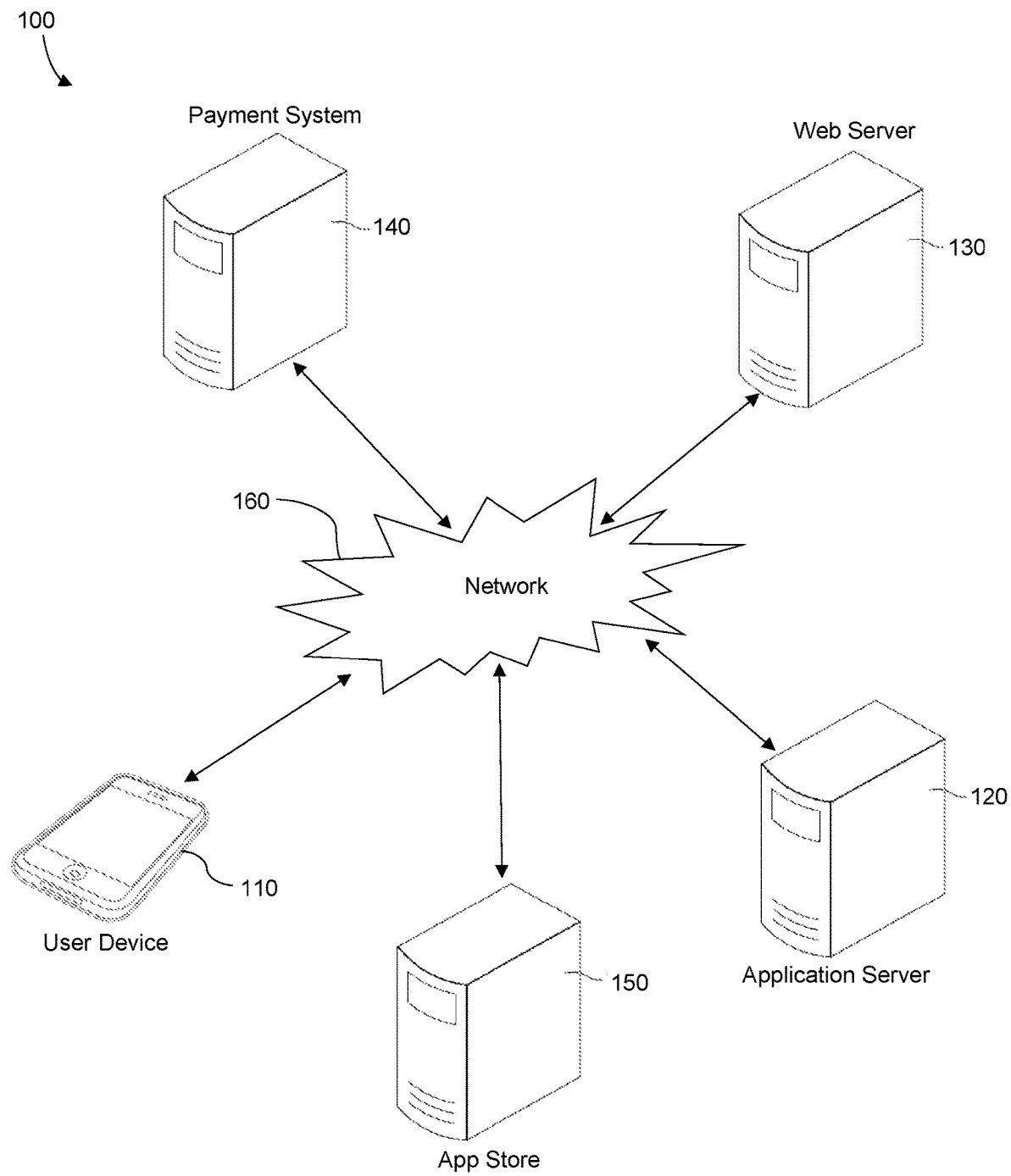
FIG. 1 is a diagram illustrating a system for acquiring mobile application users in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The examples herein relate to a mobile application that provides at least one of discounts, rewards, and promotional offers associated with products available for purchase. According to various aspects, high value rebate offers for a product (e.g., an offer for a free product, full refund, etc.) may be associated with the product. The rebate offer may be incorporated into product packaging, printed advertisements, digital advertisements, web advertisements, emails, and/or the like. The high value rebate offer may spark more consumer interest more than a typical coupon that only saves a consumer a fraction of the total cost of the product. In addition, the high value rebate offer may further include information about a mobile application that must be downloaded, installed, and registered with, before a user can receive the high value rebate offer. When the user downloads the mobile application to their device, the user may then register with an application server that controls the application and become registered as a new user of the application.

During install/registration of the mobile application, or subsequent to the application being installed, demographic information of a user may be received or acquired. For example, the demographic information may be received/acquired from cookies stored on the mobile device, from a network database, from responses by the user to questions asked during registration of the mobile application, and the like. Rather than automatically process the high value rebate (e.g., pay the cost of the rebate to the user), according to various example embodiments, the application server may compare the demographic information of the user to demographic characteristics of a target purchaser of the respective product. In the examples herein, the target purchaser may have one or more target demographic characteristics such as a target age, family size, sex, income, purchase history, and the like. Accordingly, the application server may determine whether the user of the mobile application that is newly installed matches the demographic characteristics of a target user of the purchased product. For example, if the demographics of the user of the mobile application do not match the demographics of a target purchaser of the product, the rebate may be transmitted to the manufacturer for processing the payment. As a result, the mobile application may attract new users by offering rebates on products without paying the rebates. In other words, the mobile application provider may shift the cost of the rebate to the manufacturer. The manufacturer may also benefit from such a method because the product may receive awareness from consumers that would not normally (e.g., statistically) purchase such a product.

FIG. 1 illustrates a system 100 for acquiring mobile application users in accordance with an example embodiment. Referring to FIG. 1, the system 100 includes a plurality of devices that are connected to one another via a network 160. For example, the network 160 may be a public network such as the Internet, a private network, or a combination thereof. Also, the network 160 may be a wired network, a wireless network (e.g., cellular, radio), or a combination thereof. In this example, the system 100 includes a user device 110, an application server 120, a web server 130, a payment system 140, and an app store 150 connected to each other through the network 160. It should also be appreciated that additional devices may be connected on the network 160. Also, the system 100 may not include one or more of the devices shown in FIG. 1.

The user device 110 may be a mobile device such as a mobile phone, a tablet, a phablet, a notebook, a notepad, a smart wearable device, and the like. As another example, the user device 110 may be a computer, a laptop, a server, and the like. The user device 110 may download and install mobile applications also referred to herein as applications or mobile apps. The user device 110 may select an application for download from the application store 150 (e.g., app store server), and download the mobile application from the application store 150 and/or the application server 120. Here, the application store 150 may have a widget (e.g., a displayed icon) stored on a user interface shown on the user device 110 enabling the user device 110 to connect with the application store 150 and/or the application server 120 to perform the download. Examples of the application store 150 include Google Play, Apple's App Store, Windows Store, and the like.

Once installed, the mobile application may be executed on the user device 110, and be controlled by the application server 120. For example, the application server 120 may be a computing device designed to install, host, and operate mobile applications for end users such as user device 110. The mobile application hosted by the application server 120 may be used by multiple and simultaneously connected user devices. For example, the application server 120 may include hardware and software that work together to provide computing-intensive operations and services to the residing application. The application server 120 may execute and provide the user device 110 access when utilizing the installed mobile application's business/functional logic. Also, the application server 120 may provide data redundancy, high availability, load balancing, user management, data/application security and a centralized management interface. According to various example embodiments, the mobile application provided by the application server 120 may be a savings based application that provides its users with rebates, promotional offers, discounts, and the like, on products that may be purchased in a retail store, online, and the like.

The payment system 140 may receive and process financial transactions. The payment system 140 may link bank accounts and provide for monetary exchange (e.g., online or electronic payments) using bank deposits. Although the payment system 140 is shown as a single computing device in FIG. 1, the payment system 140 is not limited to a single device, and may include multiple devices, servers, computers, and the like. For example, the payment system 140 may include devices corresponding to institutions, instruments, entities, standards, and technologies that make monetary exchange possible including one or more of an issuing bank, an acquiring bank, payment gateway, a payment processor, and the like. The payment system 140 may receive requests from the user device 110, the application server 120, or the web server 130, via the network 160. The requests may include requests to pay funds from a payment account corresponding to the mobile application to a payment account of a user of the user device 110.

According to various example embodiments, a high value rebate offer associated with a product may be provided, for example, on product packaging, via online advertisements, digital advertisements, print ads, and the like. A user of the user device 110 may collect various information from the rebate offer, including information about a mobile application to download and install in order to collect the offered rebate. For example, the rebate offer may include a link, an application name to be used in the application store, a web address, and the like, with which a user of the user device 110 may use to install and download the mobile application. In this example, the user device 110 may connect to the application store 120 using the information included on the rebate offer. Based on the information from the rebate offer, the user device 110 may select and download the mobile application via the application store 150 over the network 160. The user device 110 may install the mobile application and a user of the user device 110 may register with the mobile application by inputting various user information such as address information, demographic information, payment account information, preference information, and the like.

With the mobile application installed, the user device 110 may upload proof of the purchase of the product associated with the rebate offer to the application server 120. The user device 110 may include a camera for capturing an image of a purchase receipt and the image may be uploaded to the application server 120. As another example, the proof of purchase does not need to be an image file, but instead may be a text, email, SMS, and the like, identifying a product ID, a receipt, a coupon, and the like, of the product or purchase of the product. In addition to the proof of purchase, the application server 120 may receive a request for payment of the rebate via the mobile application executing on the user device 110. That is, the mobile application executing on the user device 110 may transmit a proof of purchase of the product along with a request for a rebate for the product to the application server 120.

In FIG. 1, web server 130 may include one or more servers or other computing devices corresponding to a manufacturer of the product associated with the high value rebate offer. That is, the web server 130 may be controlled, owned, operated, or the like, by the manufacturer. As mentioned above, the mobile application may be a money saving application that provides product rebates and/or other money saving options that can save users money or reimburse users for payments already made on purchases they make. The web server 130 may have stored therein a list of products that are available for rebate through the mobile application. In addition, the list of products may each include demographics of a target purchaser associated therewith. The demographics may be used to determine whether the mobile application provider (e.g., the application server 120) processes the payment or whether the manufacturer (e.g., the web server 130) processes the payment.

As a non-limiting example, a first product may have a target purchaser having the following demographics, between the ages of 25-34, male, family size of 3-5 people, and an income of between $50,000 and $75,000. Accordingly, the web server 130 may store these demographics along with an identification of the product. Furthermore, the web server 130 may provide the demographics of the target purchaser to the application server 120. In this example, when a user makes a purchase of the first product, and the user matches these demographics, the user may be determined to be a target purchaser of the first product. However, if the user does not match one or more of these demographics, the user may be determined to be a non-target purchaser of the first product or a purchaser who is outside the typical demographics of consumers that purchase the first product. For example, in order for the user of the mobile application to be considered a match to a target purchaser, the user may need to satisfy all of the demographics of the target purchaser, or only one or a predetermined amount of demographics of a target purchaser.

According to various aspects, a user of the user device 110 may request a rebate for a product through the mobile application executing controlled by application server 120. In this example, the product may be a product manufactured by the manufacturer corresponding to web server 130. Here, the application server 120 may determine whether the user of the mobile application on the user device 110 corresponds to a target purchaser of the product based on the demographics of the target purchaser received from the web server 130. In this case, the mobile application provider who controls the application server 120 may have an agreement with the manufacturer who controls the web server 130 whereby new users of the mobile application receive a full rebate when they purchase a product manufactured by the manufacturer and upload proof of purchase through the mobile application.

According to various aspects, the mobile application provider may pay the cost of the rebate if the new user corresponds to a target purchaser of the product. In this case, the new user is likely to be an existing user or will likely become an existing user of the product. However, if the new user does not correspond to the target purchaser of the product, the cost of the rebate can be shifted to the manufacturer. In this case, the new user is most likely purchasing the product because of the rebate and was not likely to purchase the product without the rebate. However, by purchasing the product for the first time, this new user may grow to like the product, and become a repeat customer. As such, the mobile application has attracted a new customer for the product (and the manufacturer). Accordingly, the application server 120 controlled by the app provider may shift responsibility for the rebate to the manufacturer by generating an event (e.g., liability paying for the rebate) and transmitting the rebate to the web server 130 controlled by the manufacturer. By shifting the cost between the application provider and the manufacturer, it is possible to attract new mobile application users without any cost to the mobile application provider (e.g., developer, owner, creator, etc.).

When the user device 110 requests payment of the rebate, either by uploading a copy of the purchase receipt, or some other form of proof, the application server 120 may generate an event corresponding to payment of the rebate, and determine whether the app provider bears the responsibility for paying the rebate, or whether the responsibility of paying the rebate should be shifted to the manufacturer. That is, the application server 120 may determine whether payment of the rebate corresponds to the application server 120 or the web server 130 based on a combination of the item and the received demographic information, and may either process the payment of the rebate or transmit the rebate to the web server 130, accordingly.

Figure 2:
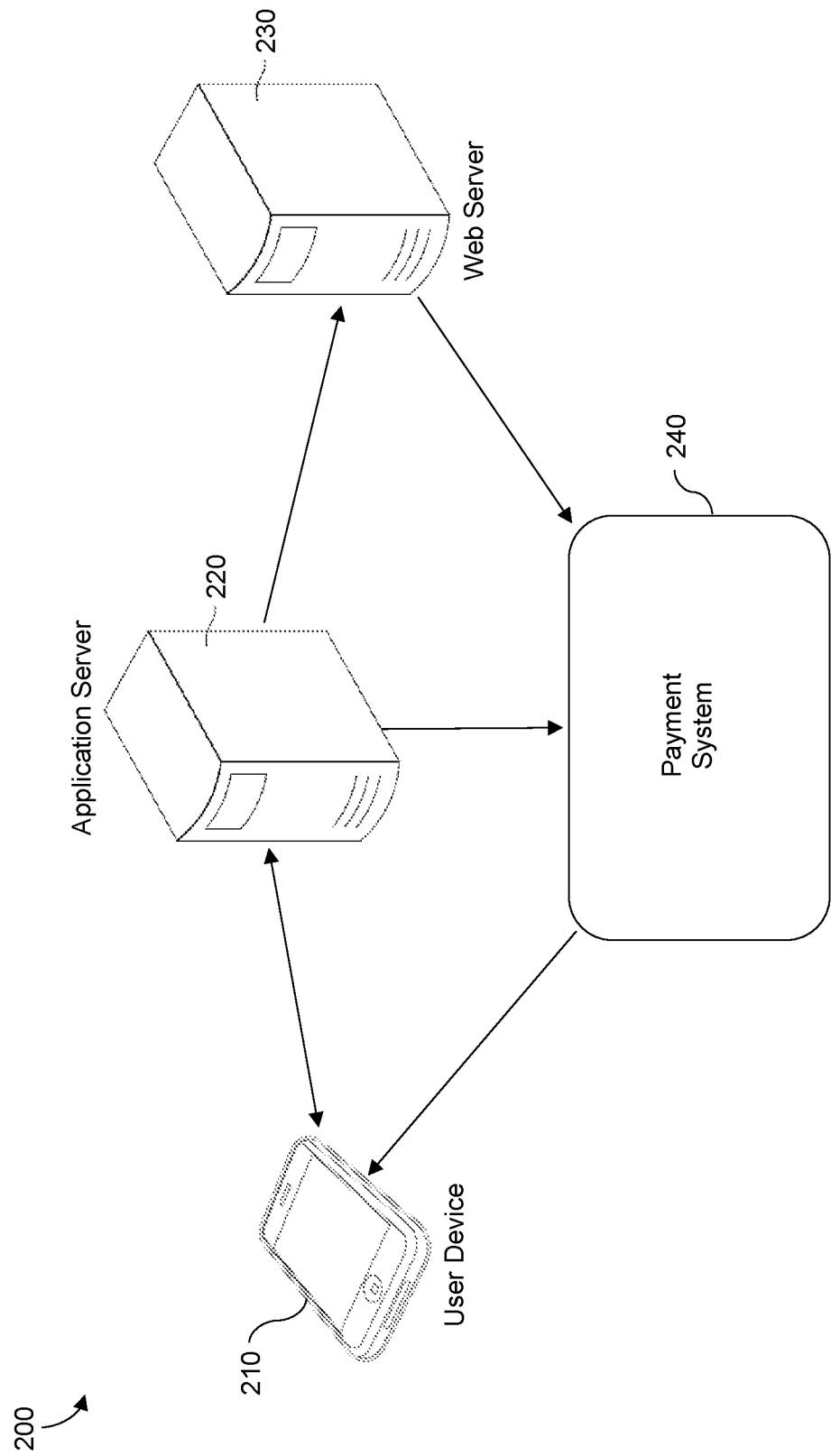
FIG. 2 is a diagram illustrating a system for processing a mobile application event in accordance with an example embodiment.

FIG. 2 illustrates a system 200 for processing a mobile application event in accordance with an example embodiment. Referring to FIG. 2, the system 200 includes a user device 210, an application server 220, a web server 230, and a payment system 240. In this example, the user device 210, application server 220, web server 230, and payment system 240 may correspond to the user device 110, application server 120, web server 130, and payment system 140 shown in FIG. 1. Therefore, redundant descriptions of these features is omitted for brevity and convenience.

According to various example embodiments, the event that is processed by system 200 may be a transaction such as a financial payment, a rebate, a reward, a promotion, and the like. The application server 220 may determine whether the event (e.g., a transaction) is to be processed by the application server 220 or by the web server 230 based on demographic information of a user of a mobile application executing on the user device 210. In various embodiments, the user device 210 may download and install the mobile application provided by application server 220. A user of the user device 210 may enter demographic information during a registration process of the mobile app, or at some other point in time. For example, during the registration process, the user may provide demographic information to the application server 220 in response to questions posed by the application server 220 through the mobile application executing on the user device 210. As another example, the demographic information may be received from cookies stored on the user device 210, from a network database connected to the application server 220 (not shown), from a third party, or the like.

When the user uploads a request for processing a transaction from the user device 210 to the application server 220, the application server 220 generates an event based thereon, and determines whether to process the event or transmit the event to the web server 230 for processing. From the user device 210 perspective, the mobile application may process a transaction and thereby make a payment to a payment account of the user device 210. However, what the user device 210 is not aware of is whether the payment is authorized/processed by a payment account of the mobile application provider or a payment account of the product manufacturer. To process the payment, the application server 220 may store payment information for both the mobile application provider and the manufacturer and determine which account to use to process the transaction, based on the demographic information. As another example, the application server 220 may automatically process the payment using the payment account of the mobile application provider and then transmit a request for reimbursement from the manufacturer to the web server 230 based on the demographic information. In these examples, the application server may generate an event based on the payment processing. For example, the event may be the handling of financial responsibility for the rebate between the mobile application provider and the manufacturer. In the example in which the application server 220 handles the event, the application server 220 may authorize payment of the rebate from the mobile application provider to the user of the user device 210. In the case in which the web server 230 handles the event, the web server 230 may authorize payment of the rebate from the product manufacturer to the user of the user device 210.

As a non-limiting example, the user of the user device 210 may purchase a product such as toilet paper from a store (e.g., retail store, grocery store, online store, or the like). In this example, the web server 230 corresponds to a server of the manufacturer of the toilet paper. Here, the user may capture a picture of a sales receipt showing purchase of the toilet paper using a camera of the user device 210 thereby generating an image file including proof of purchase of the toilet paper. Through the mobile application executing on the user device 210, the user may upload a request for payment of a rebate for the toilet paper along with the image file including the proof of purchase of the toilet paper, to the application server 220. The rebate may be a high value rebate such as reimbursement for the total cost of the product. In response to receiving the request, the application server 220 may determine whether to authorize the rebate. For example, the application server 220 may determine whether the user is a new user of the mobile application, whether the rebate corresponds to the toilet paper, and the like, and authorize the rebate selectively based on the determining.

In response to determining to authorize the rebate, the application server 220 may determine whether the rebate is to be paid by the mobile application provider (e.g., application server 220) or whether the rebate is to be paid by the product manufacturer (e.g., web server 230). In this example, the web server 230 may provide the application server 220 with demographic characteristics of a target purchaser of the toilet paper from the manufacturer. That is, the target purchaser is a common purchaser of the toilet paper. The demographic characteristics may include at least one of age, sex, family size, spending history, mobile app usage information, and/or other statistical data. The application server 220 may compare the demographic information of the user of the mobile application executing on the user device 210 with the demographic information of the target purchaser received from the web server 230, to determine whether the rebate should be paid for by the mobile application provider or the manufacturer.

For example, if the demographic information of the user of the mobile application executing on the user device 210 matches the demographic characteristics of the target purchaser, the mobile application provider may assume the responsibility for paying the rebate. The application server 220 may transmit a transaction processing message request to the payment system 240 and authorize payment of the rebate from an account of the mobile application provider to an account of the user of the user device 210, which are previously stored on the application server 220. As another example, if the demographic information of the user of the mobile application executing on the user device 210 does not match the demographic characteristics of the target purchaser, the manufacturer may assume the responsibility for paying the rebate. Here, the application server 220 may transmit a notice or message to the web server 230 indicating that the rebate is to be processed by the manufacturer. In response, the web server 230 may transmit a transaction processing request to the payment system 240 and authorize payment of the rebate from an account of the manufacturer to an account of the user of the user device 210 which are previously stored on the web server 230. An example of the transaction processing request includes an ISO 8583 authorization request message.

Accordingly, the payment system 240 may receive the request from one or more of the application server 220 and the web server 230, and process the request. When the transaction has been processed, the payment system may generate a transaction successful message and send the message to the user device 210.

Figure 3:
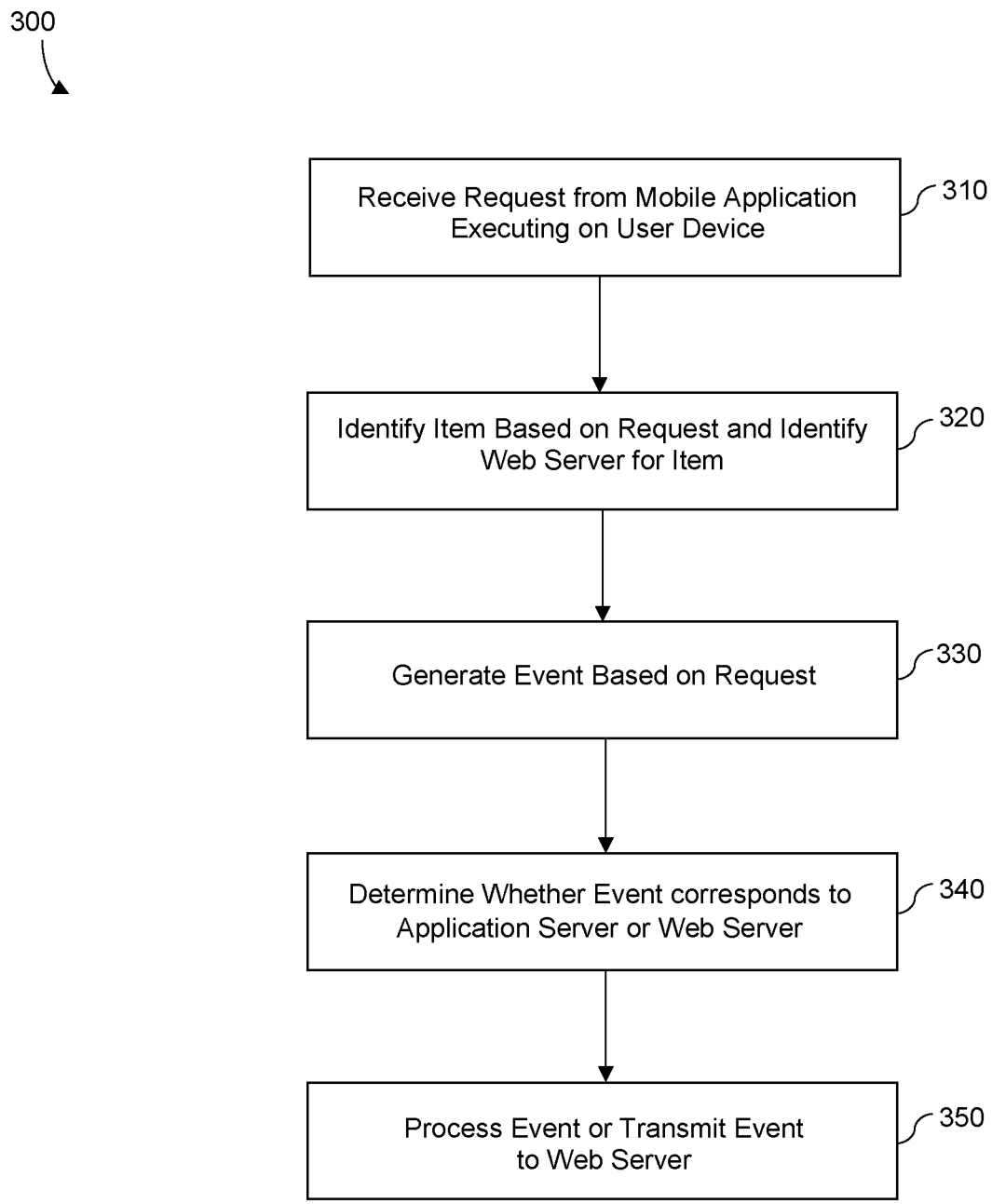
FIG. 3 is a diagram illustrating a method of processing a mobile application event in accordance with an example embodiment.

FIG. 3 illustrates a method 300 of processing a mobile application event in accordance with an example embodiment. As an example, the method 300 may be performed by the application server 120 shown in FIG. 1, the application server 220 shown in FIG. 2, and the like. Referring to FIG. 3, the method includes receiving a request from a mobile application executing on a mobile device (e.g., user device), in 310. For example, the request may include proof of purchase of a product along with a request to process a transaction such as a payment for a rebate or refund of the purchased product. The request may include an image file captured of a purchase receipt. As another example, the request may include a product ID or product key entered by the user of the mobile device, or some other form of proof. In some cases, the request may also include demographic information of a user of the mobile device. As another example, the demographic information of the user may be received previously from the mobile application executing on the mobile device (e.g., during a registration process of the mobile application on the mobile device) or from another device such as a gateway, database, cookies server, or the like.

In 320, the method includes identifying item information from the request, and identifying a web server corresponding to the item. For example, the item may be a product or a service. When the request includes the image file, the item information may be identified from within the image by performing visual recognition on the receipt. For example, a product ID, a product name, a product code, or the like, may be identified from within the image. As another example, the product may be identified from the request itself which may include text input of the name of the product, a code of the product, or the like. By identifying the item and the application server can also identify a manufacturer of the item. Furthermore, the application server may identify a web server corresponding to the manufacturer based on information previously stored at the application server such as web addresses, URLs, and the like.

In 330, the method includes generating an event based on the request. For example, the event may be the act of authorizing the transaction for payment of a rebate or refund for the item identified from the request. Furthermore, in 340, the method includes determining whether the event generated in 330 corresponds to the application server (e.g., the mobile application provider) or the web server (e.g., product manufacturer) based on the demographic information of the user of the mobile application. For example, whether the event belongs to the application server or the web server may be determined based on whether the user of the mobile application matches a target purchaser of the product. Furthermore, in 350 the method includes processing the event or transmitting the event to the web server. For example, in 350, the application server may authorize payment of the transaction or may shift responsibility for paying the transaction to the web server.

Figure 4:
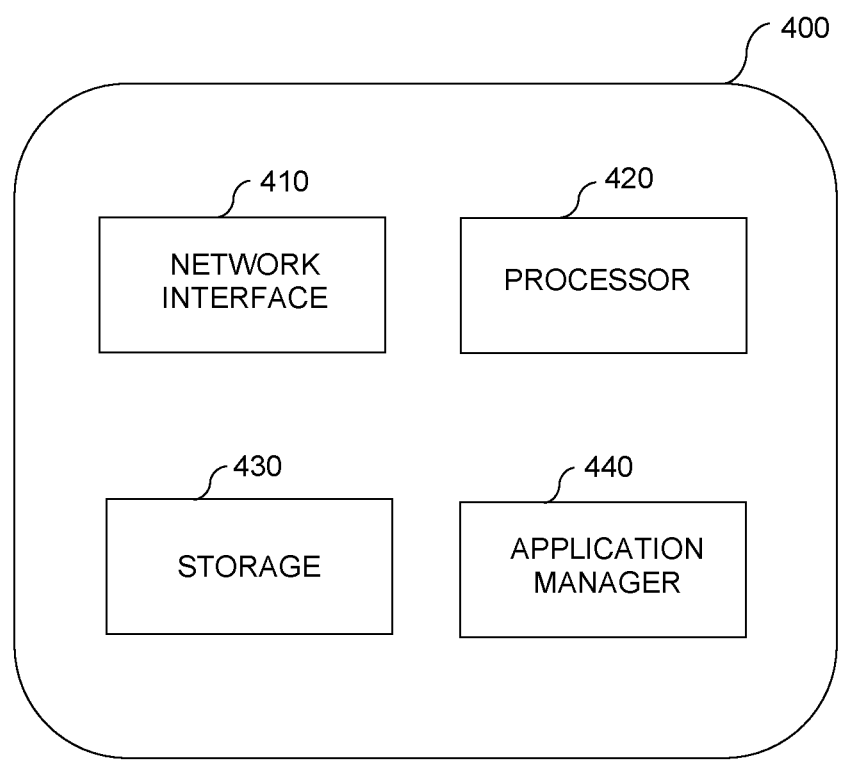
FIG. 4 is a diagram illustrating an application server for processing a mobile application event in accordance with an example embodiment.

FIG. 4 illustrates an application server 400 for processing a mobile application event in accordance with an example embodiment. For example, the application server 400 may correspond to the application server 120 shown in FIG. 1, the application server 220 shown in FIG. 2, or another device or combination of devices. Also, the application server 400 may perform the method 300 shown in FIG. 3. Referring to FIG. 4, the application server 400 includes a network interface 410, a processor 420, a storage 430, and an application manager 440. The network interface 410 may transmit and receive data over a network such as the Internet and/or a private network. The processor 420 may control the overall operations of the application server 400 and may include hardware for performing the operations of the application server described herein. The application server 400 also includes the application manager 440 which controls the installation, registration process, and execution of mobile applications on user devices. For example, the application manager 440 may handle application operations between users and the mobile application backend and/or databases (e.g., storage 430). The storage 430 may store information about mobile devices (e.g., device ID's), information about users of mobile applications, and the like. Also, the storage 430 may store device tokens for each mobile device that downloads and installs the mobile application. The device token may identify the device by device ID and identify the mobile application that was installed on the device.

The network interface 410 may receive, via the Internet, a request from a mobile application executing on a mobile device. The request may include a request for payment of a rebate or a refund for a product purchased by a user of the mobile device. For example, the request may also include a proof of purchase of a product associated with the rebate such as an image file of a receipt, a code, a password or PIN number, and the like. In addition, the network interface 410 may receive demographic information of the user of the mobile application executing on the mobile device. For example, the demographic information may be received during a registration process of the mobile application on the mobile device, or the demographic information may be received from another network object such as a database, a server, or the like. The processor 420 may identify an item that corresponds to the request. For example, the item may be a good or a server. The processor 420 may also identify a web server that corresponds to the item. For example, the web server may be controlled by a manufacturer of the product or service.

The processor 420 may also generate an event based on the request, and determine whether the event corresponds to the application server 400 or the web server based on a combination of the item and the received demographic information. For example, the processor 420 may determine whether the event is handled by the application server 400 or the web server based on whether the received demographic information satisfies predetermined demographic criteria for the respective item. In this example, the predetermined geographic criteria for the respective item may be received by the network interface 410 from the manufacturer of the item, and may include one or more of gender, age, family size, total cost of purchase, and the like. For example, in response to the received demographic information satisfying the predetermined geographic criteria for the item, the processor 420 may process the event, and in response to the received demographic information not satisfying the predetermined geographic criteria for the item, the processor 420 may control the network interface 410 to transmit the event to the web server.

Figure 5:
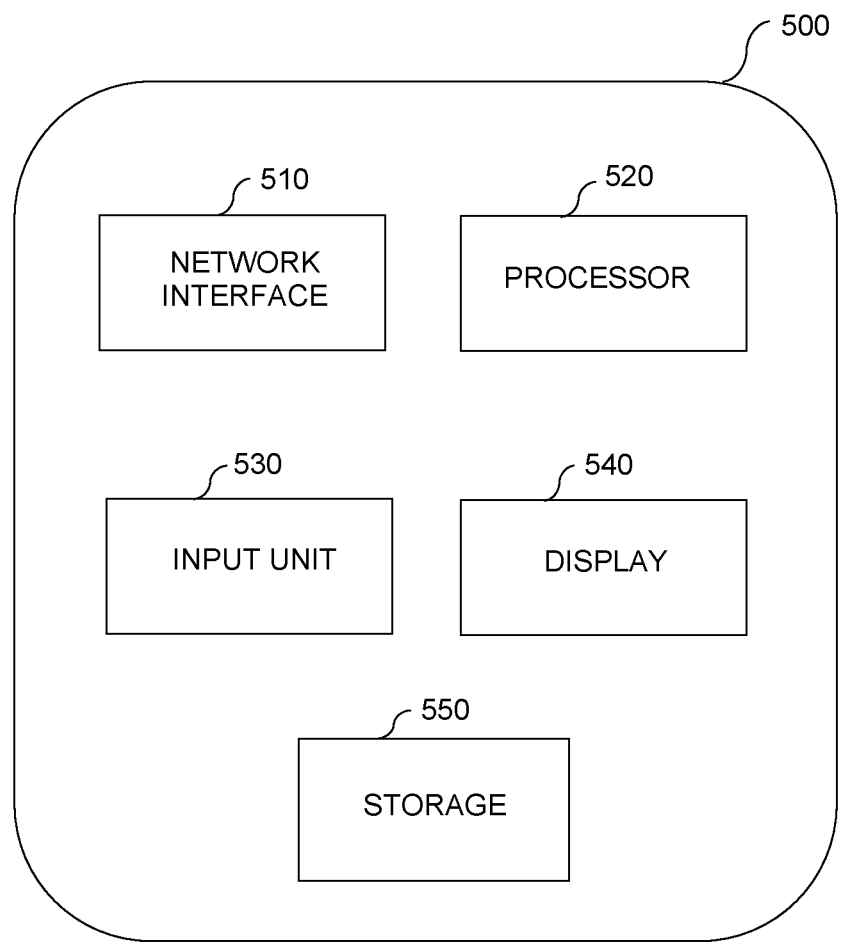
FIG. 5 is a diagram illustrating a user device for processing a mobile application event in accordance with an example embodiment.

FIG. 5 illustrates a user device 500 for processing a mobile application event in accordance with an example embodiment. The user device 500 may correspond to the user device 110 shown in FIG. 1, the user device 210 shown in FIG. 2, or the like, and may perform any of the actions or operations previously described therewith. For example, the user device 500 may be a mobile device, a tablet, a computer, a laptop computer, a notebook computer, a smart wearable device, a kiosk, a television, an appliance, and the like.

Referring to FIG. 5, the user device 500 includes a network interface 510, a processor 520, an input unit 530, a display 540, and a storage 550. The network interface 510 may transmit and receive data over a network such as the Internet and/or a private network. The processor 520 may include a single core processing device, a multicore processing device, or multiple processing devices. The processor 520 may control the overall operations of the user device 500. The input unit 530 may include one or more of a keyboard, a mouse, a touchpad, a voice recognition module, a motion recognition module, and the like. The display 540 may be an embedded display such as a touch screen on a mobile device or it may be an external display attached to the computing device through a connection such as a wired or wireless connection. The storage 550 may include any desired memory, for example, random access memory (RAM), one or more hard disks, cache, hybrid memory, an external memory, flash memory, and the like. Although not shown in FIG. 5, the user device 500 may include other features not shown, or one or more of the features may be omitted.

According to various aspects, the user device 500 may download and install mobile applications through an application store. For example, software for a mobile application may be received via the network interface 510 and may be installed by the processor 520 in response to commands input by a user through the input unit 530. The installation of the mobile application and registration with the mobile application may also be performed with an application server corresponding to the mobile application. While the mobile application is executing on the user device 500, the user may register a payment account with the application server through the mobile application. The user may also input demographic information and transmit the demographic information to the application server through the mobile application executing on the user device 500. Also, the user may upload the image of the proof of purchase to the application server via the network interface 510 under the control of the processor 520.

According to various example embodiments, described herein is a system and method for acquiring new users for a mobile application. The average mobile application (or developer thereof) may spend a significant amount of money on advertising resulting in a very high cost per install of their mobile application (e.g., a cost per install of $20.00). According to various aspects, the cost per install of a mobile application can be reduced to the cost of a product for sale (e.g., a cost per install of $2.00, $3.00, $4.00, and the like) or to zero if the cost of the product for sale is refunded by a manufacturer of the product. That is, by providing free rebates or other high value rebates for products only after the mobile application has been downloaded and installed, a provider of the mobile application can acquire new users without incurring the significant expense of advertising the mobile application. Furthermore, the provider does not need to worry about whether the mobile application is popular with application store search engines. The example embodiments also benefit the manufacturers of the product, because their products receive brand recognition based on the high value rebate offer.

As used herein, the term account or payment account may refer to a card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like, and also refer to any suitable payment account such as a deposit account, bank account, credit account, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the invention as set forth in the appended claims.

What is claimed is:

1. An application server comprising:
   a network interface configured to receive demographic information of a customer and a request from a mobile application hosted by the application server and executing on a mobile device of the customer; and
   a processor configured to
      identify proof that an item has been purchased by the customer based on data within the request,
      identify a manufacturer that corresponds to the purchased item,
      generate an additional transaction to be performed subsequent to the item being purchased in response to identifying the proof,
      determine whether the customer is a target user of the item based on the received demographic information of the customer and predetermined demographic criteria of the manufacturer for the item, and
      assign the additional transaction to be performed to the application server that hosts the mobile application or a web server of the manufacturer of the item based on whether the customer is the target user of the item,
   wherein the processor is further configured to process the additional transaction or control the network interface to transmit the additional transaction to the web server of the manufacturer, based on whether the additional transaction is assigned to the application server or the web server.

2. The application server of claim 1, wherein the item comprises a product and the web server corresponds to a manufacturer of the product.

3. The application server of claim 1, wherein the processor is further configured to determine that the additional transaction is to be handled by the application server in response to determining the received demographic information of the user satisfies the predetermined demographic criteria for the item.

4. The application server of claim 3, wherein the network interface is further configured to receive the predetermined demographic criteria from the web server.

5. The application server of claim 4, wherein, if the received demographic information satisfies the predetermined geographic criteria for the item, the processor processes the additional transaction, and
   if the received demographic information does not satisfy the predetermined demographic criteria for the item, the processor controls the network interface to transmit the additional transaction to the web server.

6. The application server of claim 1, wherein the processor determines that the additional transaction corresponds to the application server, and processes the additional transaction.

7. The application server of claim 1, wherein the processor determines the additional transaction corresponds to the web server, and the processor controls the network interface to transmit the additional transaction to the web server.

8. A method of an application server, the method comprising:
- receiving demographic information of a customer and a request from a mobile application executing on a mobile device of the customer;
- identifying proof that an item has been purchased by the customer based on data within the request;
- identifying a manufacturer that corresponds to the purchased item;
- generating an additional transaction to be performed subsequent to the item being purchased in response to identifying the proof;
- determining whether the customer is a target user of the item based on the received demographic information of the customer and predetermined demographic criteria of the manufacturer for the item,
- assigning the additional transaction to be performed to an application server that hosts the mobile application or a web server of the manufacturer of the item based on whether the customer is the target user of the item; and
- processing the additional transaction by the application server or transmitting the additional transaction to the web server of the manufacturer, based on whether the additional transaction is assigned to the application server or the web server.

9. The method of claim 8, wherein the item comprises a product and the web server corresponds to a manufacturer of the product.

10. The method of claim 8, wherein the determining comprises determining that the additional transaction is to be handled by the application server in response to determining the received demographic information of the user satisfies the predetermined demographic criteria for the item.

11. The method of claim 10, wherein the method further comprises receiving the predetermined demographic criteria from the web server.

12. The method of claim 11, wherein, if the received demographic information satisfies the predetermined geographic criteria for the item, the method comprises processing the additional transaction by the application server, and
if the received demographic information does not satisfy the predetermined demographic criteria for the item, the method comprises transmitting the additional transaction to the web server.

13. The method of claim 8, wherein the determining comprises determining the additional transaction corresponds to the application server, and the method comprises processing the additional transaction by the application server.

14. The method of claim 8, wherein the determining comprises determining the additional transaction corresponds to the web server, and the method further comprises transmitting the additional transaction to the web server.

* * * * *